(12) United States Patent
Warms et al.

(10) Patent No.: US 12,437,612 B2
(45) Date of Patent: Oct. 7, 2025

(54) PERSISTENT COLLECTION FEATURE SYSTEMS AND METHODS

(71) Applicant: Aristocrat Technologies, Inc., Las Vegas, NV (US)

(72) Inventors: Nathan Warms, Austin, TX (US); Jennifer Mizzi, Round Rock, TX (US); Rogelio Decasa, Jr., Renton, WA (US); Hanna Sanborn, Georgetown, TX (US); Zachary Smith, Austin, TX (US); Erick Ching, Cedar Park, TX (US); Kevin Walsh, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 301 days.

(21) Appl. No.: 17/822,747

(22) Filed: Aug. 26, 2022

(65) Prior Publication Data

US 2023/0154286 A1    May 18, 2023

Related U.S. Application Data

(60) Provisional application No. 63/280,442, filed on Nov. 17, 2021.

(51) Int. Cl.
  *G07F 17/32*    (2006.01)
  *G06F 7/58*    (2006.01)
  *G07F 17/34*    (2006.01)

(52) U.S. Cl.
  CPC .......... *G07F 17/3267* (2013.01); *G06F 7/588* (2013.01); *G07F 17/3213* (2013.01); *G07F 17/34* (2013.01)

(58) Field of Classification Search
  CPC .. G07F 17/3213; G07F 17/3267; G07F 17/34; G07F 17/3258; G07F 17/3255; G07F 17/3209; G07F 17/3244
  See application file for complete search history.

(56) References Cited

U.S. PATENT DOCUMENTS

| | | | |
|---|---|---|---|
| 6,186,894 B1* | 2/2001 | Mayeroff | G07F 17/34 463/16 |
| 2012/0172107 A1* | 7/2012 | Acres | G07F 17/34 463/16 |
| 2019/0392677 A1* | 12/2019 | Halvorson | G07F 17/34 |
| 2020/0312086 A1 | 10/2020 | Kendall | |
| 2020/0342715 A1* | 10/2020 | Hiten | G07F 17/3267 |
| 2021/0005053 A1* | 1/2021 | Uss | G07F 17/3267 |
| 2021/0110661 A1* | 4/2021 | Däumling | G07F 17/3213 |

* cited by examiner

*Primary Examiner* — Justin L Myhr
(74) *Attorney, Agent, or Firm* — Armstrong Teasdale LLP

(57) ABSTRACT

A gaming device is provided. The gaming device is configured to determine that at least a threshold number of scatter symbols is displayed in respective slot positions of a plurality of reels, determine a number of free spin credits for a free spin feature, for each of the plurality of reels, cause the game display to increment a collection indicator corresponding to each reel by a number of scatter symbols displayed in the corresponding reel, generate at least one collectible symbols in one of the slot position, cause the game display to increment the collection indicator for the reels in which the collection symbols are displayed, determine that one of the collection indicators has reached a threshold number of collectible symbols, and cause the game display to display a reel replacement feature in the reel corresponding to the one of the collection indicators.

16 Claims, 14 Drawing Sheets

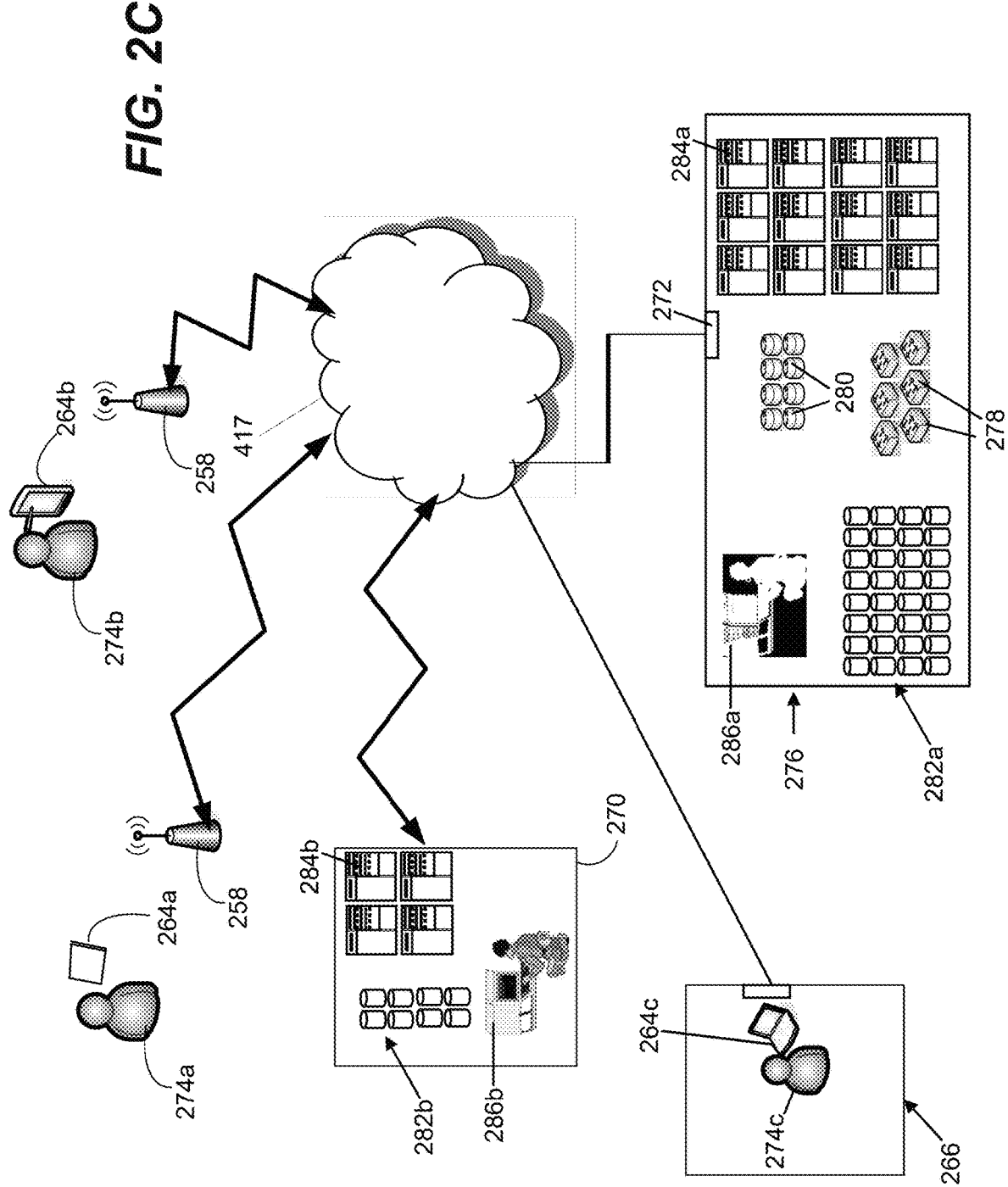

510

PERSISTENT COLLECTION FEATURE SYSTEMS AND METHODS

CROSS-REFERENCE TO RELATED APPLICATIONS

This application claims the benefit of priority to U.S. Provisional Application Ser. No. 63/280,442, filed Nov. 17, 2021, the contents and disclosures of which are hereby incorporated by reference in their entirety.

TECHNICAL FIELD

The field of disclosure relates generally to electronic gaming, and more particularly, to a gaming device operation that includes a persistent collection feature in which collectible symbols persist from a base game instance to a bonus game.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF SUMMARY

In one aspect, a gaming device is provided. The gaming device includes a game display configured to display a game interface including a plurality of slot positions, a memory device, and a processor in communication with the game display and the memory device. The processor is configured to, in response to a game instance of a base game, determine that at least a threshold number of scatter symbols is displayed in respective slot positions of a plurality of reels. The processor is further configured to, in response to the determination that at least a threshold number of scatter symbols is displayed, determine a number of free spin credits for a free spin feature. The processor is further configured to, in response to the determination that at least a threshold number of scatter symbols is displayed, for each of the plurality of reels, cause the game display to increment a collection indicator corresponding to each reel by a number of scatter symbols displayed in the corresponding reel. The processor is further configured to, in response to a free spin instance of the free spin feature, generate at least one collectible symbol in one of the slot positions of the plurality of reels. The processor is further configured to, in response to determining that one or more collectable symbols are displayed, cause the game display to increment the collection indicator for each of the plurality of reels in which the collection symbols are displayed. The processor is further configured to determine that one of the collection indicators is displaying a threshold number of collectible symbols. The processor is further configured to, in response to determining that one of the collection indicators has reached the threshold number of collectible symbols, cause the game display to display a reel replacement feature in place of the reel corresponding to the one of the collection indicators.

In another aspect, a method is provided. The method is performed by a gaming device including a game display configured to display a game interface including a plurality of slot positions, a memory device, and a processor in communication with the game display and the memory device. The method includes in response to a game instance of a base game, determining, by the processor, that at least a threshold number of scatter symbols is displayed in respective slot positions of a plurality of reels. The method further includes in response to the determination that at least a threshold number of scatter symbols is displayed, determining, by the processor, a number of free spin credits for a free spin feature. The method further includes, in response to the determination that at least a threshold number of scatter symbols is displayed, for each of the plurality of reels, causing, by the processor, the game display to increment a collection indicator corresponding to each reel by a number of scatter symbols displayed in the corresponding reel. The method further includes, in response to a free spin instance of the free spin feature, generating, by the processor, at least one collectible symbol in one of the slot positions of the plurality of reels. The method further includes, in response to determining that one or more collectable symbols are displayed, causing, by the processor, the game display to increment the collection indicator for each of the plurality of reels in which the collection symbols are displayed. The method further includes determining, by the processor, that one of the collection indicators is displaying a threshold number of collectible symbols. The method further includes, in response to determining that one of the collection indicators has reached the threshold number of collectible symbols, causing, by the processor, the game display to display a reel replacement feature in place of the reel corresponding to the one of the collection indicators.

In another aspect, at least one non-transitory computer-readable media having computer-executable instructions embodied thereon is provided. When executed by a gaming device including a game display configured to display a game interface including a plurality of slot positions, a memory device, and a processor in communication with the game display and the memory device, the computer-executable instructions cause the processor is to, in response to a game instance of a base game, determine that at least a threshold number of scatter symbols is displayed in respective slot positions of a plurality of reels. The computer-executable instructions further cause the processor to, in response to the determination that at least a threshold number of scatter symbols is displayed, determine a number of free spin credits for a free spin feature. The computer-executable instructions further cause the processor to, in response to the determination that at least a threshold number of scatter symbols is displayed, for each of the plurality of reels, cause the game display to increment a collection indicator corresponding to each reel by a number of scatter symbols displayed in the corresponding reel. The computer-executable instructions further cause the processor to, in response to a free spin instance of the free spin feature, generate at least one collectible symbol in one of the slot positions of the plurality of reels. The computer-executable instructions further cause the processor to, in response to determining that one or more collectable symbols are displayed, cause the game display to increment the collection indicator for each of the plurality of reels in which the collection symbols are displayed. The computer-executable instructions further cause the processor to determine that one of the collection indicators is displaying a threshold number of collectible symbols. The computer-executable instructions further cause the processor to, in response to determining that one of the collection indicators has reached the threshold number of collectible symbols, cause the game display to display a reel replacement feature in place of the reel corresponding to the one of the collection indicators.

BRIEF DESCRIPTION OF THE DRAWINGS

FIG. 2C is a diagram that shows examples of components of a system for providing online gaming according to some aspects of the present disclosure.

DETAILED DESCRIPTION

Figure 1:
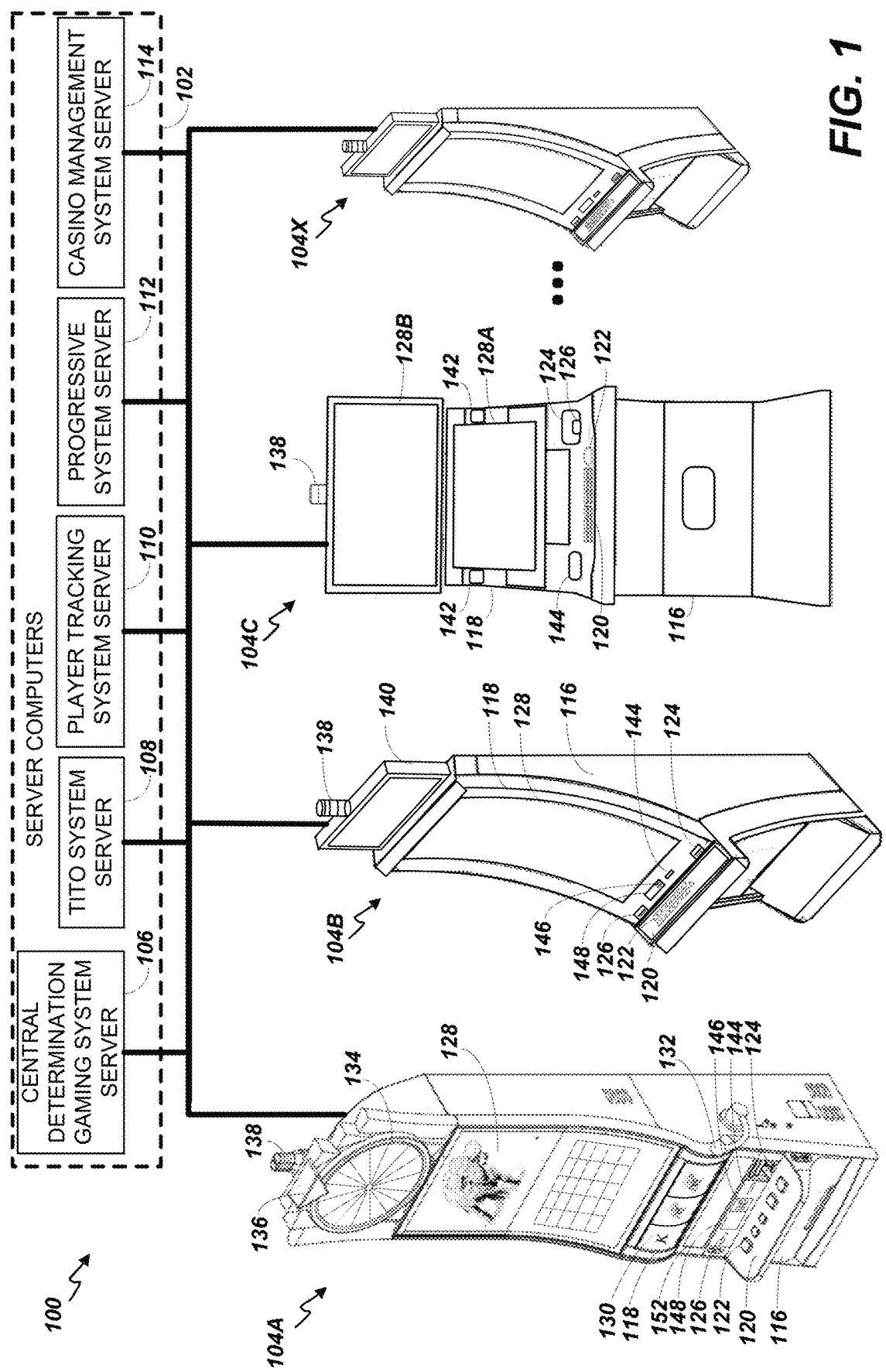
FIG. 1 is an exemplary diagram showing several gaming machines networked with various gaming related servers.

A gaming device operation and/or capability for implementing a free spin feature with collection-triggered wild reels is provided herein. In the example embodiments, in response to a game instance of a base game (e.g., a slot game) performed on a gaming device (e.g., an EGM and/or mobile device), the gaming device determines that a threshold number of a certain symbol (referred to herein as "scatter symbols") is displayed. For example, in the base game, different symbols may be displayed in respective reel positions of a slot game, and if a certain threshold number (e.g., three or more) scatter symbols are displayed among these reel positions, a free spin feature may be initiated, wherein the user may perform a certain number of spins (corresponding to the number of free spin credits) without wagering their own credit.

When the free spin feature is initiated, a collection feature may also be initiated. As a spin outcome, certain symbols (referred to herein as "collectible symbols") may be displayed, which may have a value of one or more (e.g., one, two, or three) collectible items. The number of collectible items appearing in a given slot reel may be recorded, and an indicator (sometimes referred to herein as a "collection indicator") corresponding to each reel may be updated to indicate how many collectible items have appeared in the corresponding reel.

Upon initiation of the free spin feature, collectible item credit may be awarded for each scatter symbol displayed in a respective reel. For example, if a certain reel includes two scatter symbols when the free spin feature is initiated, the collection indicator for that reel may be incremented by two prior to the performance of any free spins, giving users a "head start" in collecting the collectible items during the free spin feature. When the free spins are performed, collectible symbols being displayed may result in the collection indicator being incremented further.

When a certain threshold number of items has been collected for a given reel, certain special outcomes may occur. For example, another feature (sometimes referred to herein as a "reel replacement feature") may be displayed in place of the reel for a certain number of spins. In some embodiments, the reel replacement feature may be a "wild" reel. "Wild symbols" are slot symbols that can act in place of other symbols needed to complete certain combinations for receiving an award (e.g., a payout). A "wild" reel acts as a reel having a wild symbol in each position, so when a wild reel is present, players are more likely to achieve combinations that result in awards. During the free spin feature, free spins may be performed automatically and/or in response to player input until no free spin credits remain, at which point the free spin feature ends. At the end of the free spin feature, the collectible indicators and any currently displayed reel replacement features (e.g., wild reels) may be reset, and the player may receive any credit awarded as a result of the free spins to a player credit balance.

Certain technical benefits are realized based upon the present disclosure. For example, a plurality of random determinations may be made (e.g., via a plurality of RNG outcomes and/or a plurality of lookup tables) in order to determine not only one or more game outcomes but also one or more display features. For example, the display of scatter symbols may be randomly determined, the threshold number of scatter symbols to trigger a special outcome may be randomly determined, the display of collectible symbols may be randomly determined, the threshold number of collectible symbols in a given reel to trigger a special outcome may be randomly determined, the display of wild symbols and/or wild reels may be randomly determined, the effects of wild symbols and/or wild reels may be randomly determined, a number of free spins awarded during a free spin feature may be randomly determined, and so forth. The amount of random determinations possible in embodiments described herein result in an increased variety of possible game outcomes to be provided and therefore an improved game as it is less likely any outcomes would be repeated (e.g., and/or displayed in the same manner).

Certain display benefits are also realized herein as technical benefits achieved by the present disclosure (e.g., because certain technical problems arise when trying to communicate/display a significant amount of information on a screen of limited size). For example, as explained herein, in some embodiments, animations may be displayed during the initiation of the free spin feature and/or during the collection process to better communicate to a player that the free spin feature and/or the collection is occurring (e.g., an animation during the start of the free spin feature and/or with an appearance of each collectible symbol). In some embodiments, indicators (e.g., located above each reel) depict a number of symbols collected for the reel so far (e.g., out of a total needed to trigger a special outcome such as a display of a wild reel). Accordingly, the present disclosure provides a variety of improvements in communicating information to a player in a limited amount of display space/real estate—thereby providing an improved interface.

In the example embodiment, free spins are performed, and collectible symbols are displayed and tracked all while controlling return to player (RTP). Certain technical problems are realized when generating new display improvements for electronic games because RTP must also be controlled. Accordingly, in example embodiments described herein, RTP is controlled by at least one lookup table (e.g., wherein at least one lookup in the at least one lookup table is controlled by an RNG call, as described in the examples) indicating whether to display certain symbols such as the collectible symbols.

In some embodiments, a plurality of lookup tables may be stored by the system, and a particular lookup table defining particular game outcomes associated with an RNG call may be selected for each reel for each game instance. For example, each reel may be associated with one or more lookup tables, such that certain reels may have different probability of displaying certain outcomes, such as scatter symbols and/or collectible symbols. Additionally, the lookup table may be selected based on current states of the game, such as a number of symbols currently collected for a given reel. For example, a likelihood of a collectible symbol being displayed in a reel may increase or decrease based on how many collectible symbols have previously been displayed in the reel. Using a plurality of selectable lookup tables may therefore increase a variability of game outcomes while enabling a desired RTP to be achieved.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor)

mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
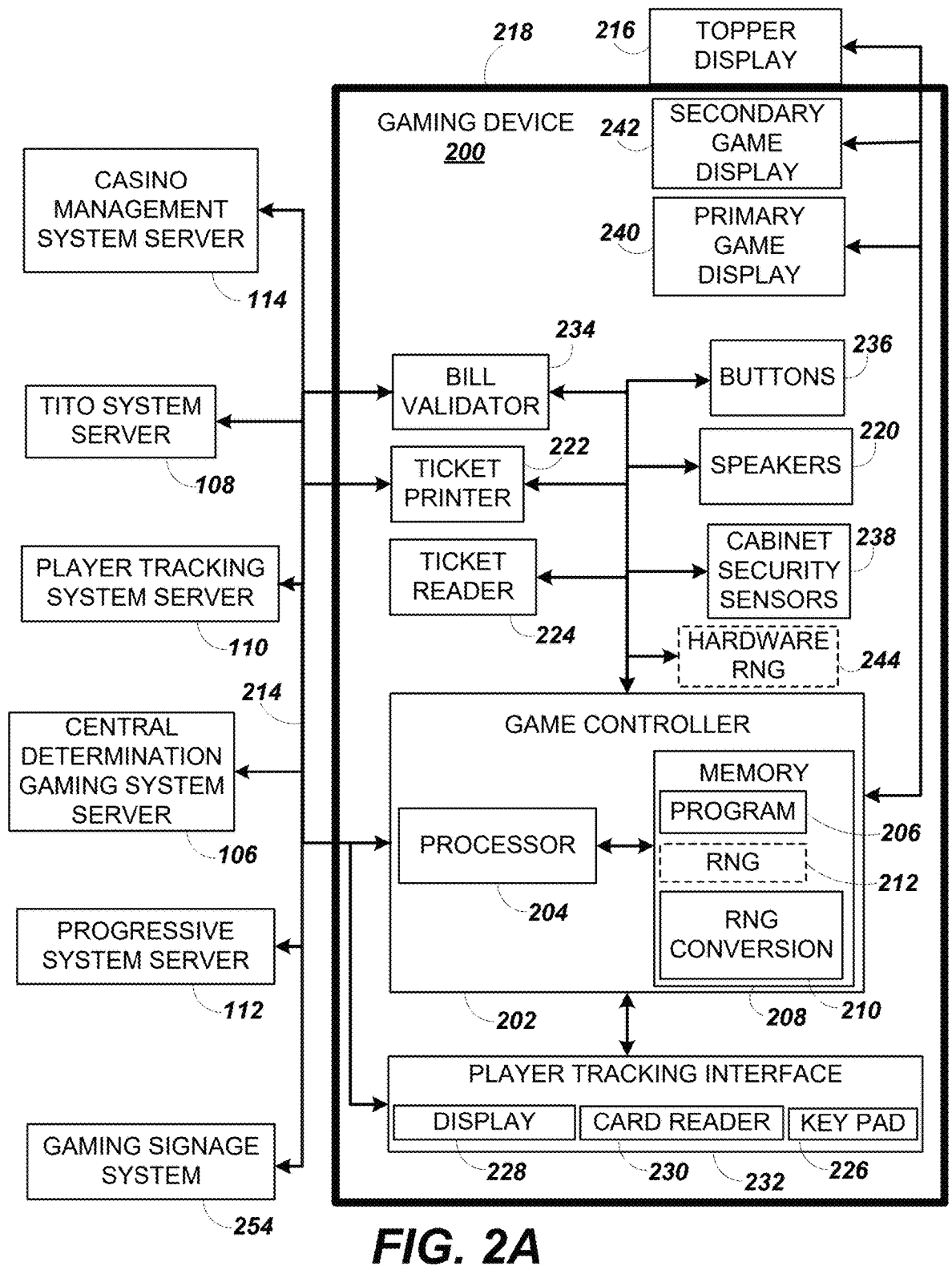
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS© system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
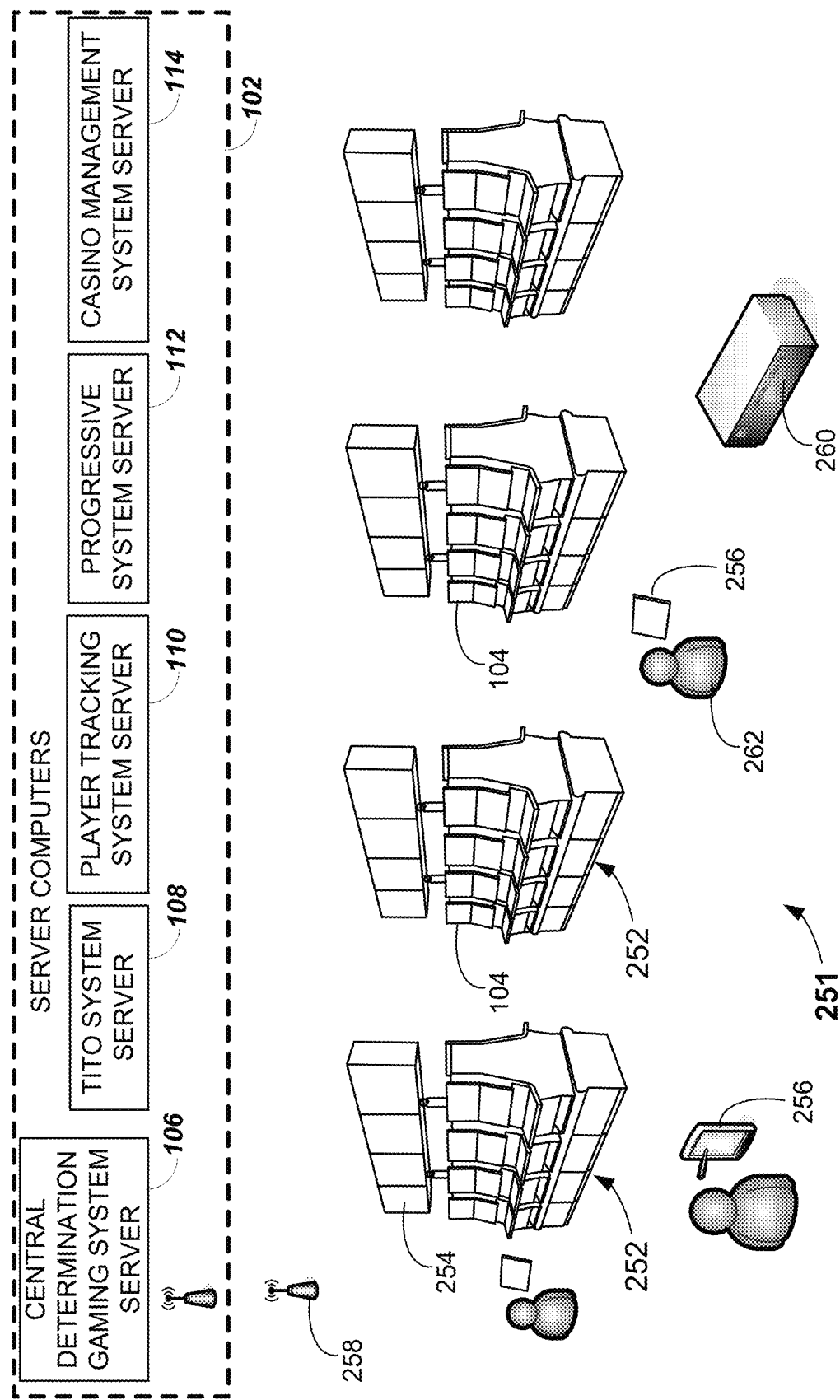
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286b. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server (s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
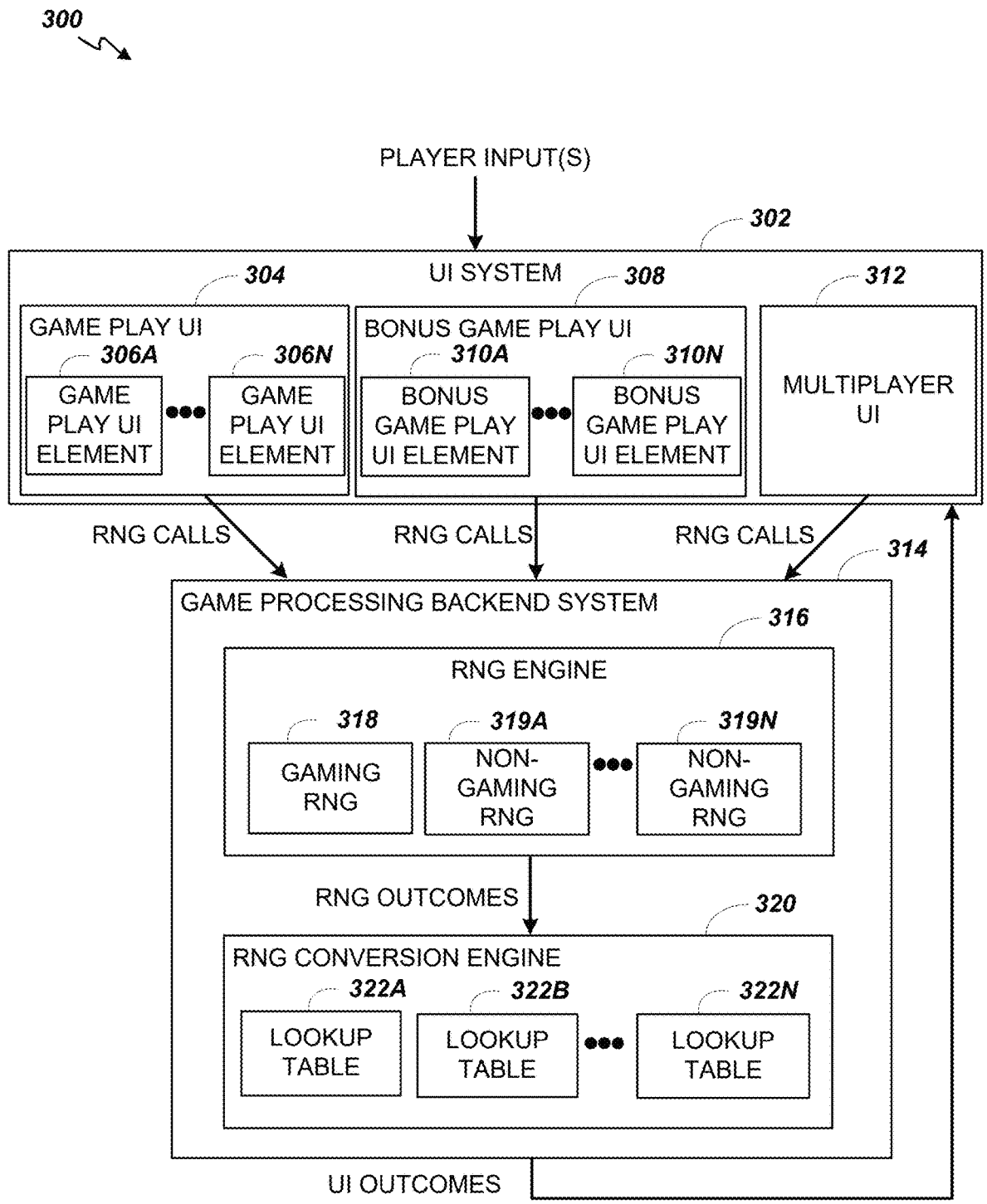
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
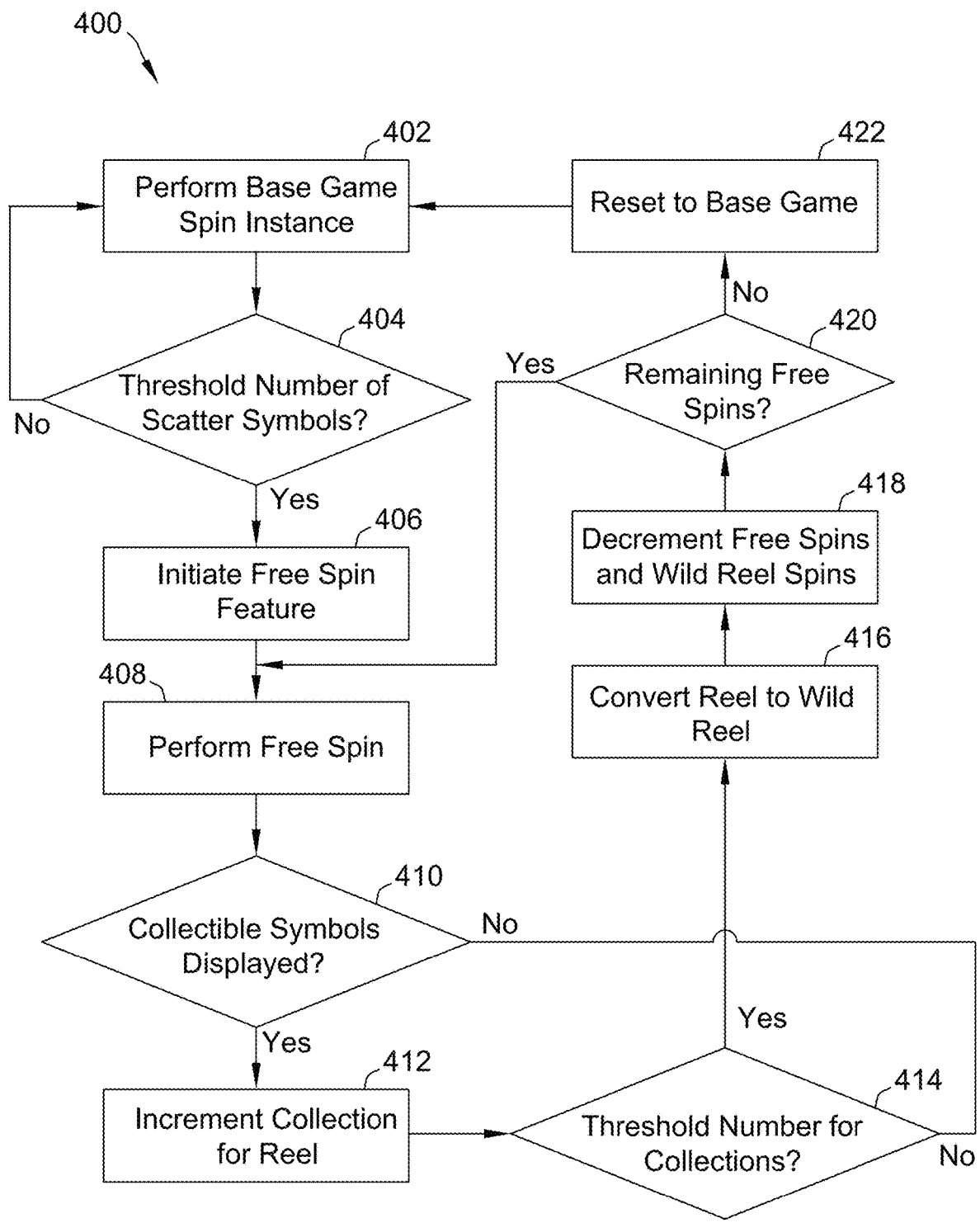
FIG. 4 is a flowchart illustrating an example process for an electronic game played on the systems shown in FIG. 1 having a free spin feature with collection-triggered wild reels.

FIG. 4 is a flowchart illustrating an example process 400 for an electronic game that provides a free spin feature with collection-triggered wild reels. In the example embodiment, process 400 includes performing 402 a game instance (or "spin") of the base game, such as the electronic slot game described with respect to FIGS. 1-3 at gaming devices 104A-104X (shown in FIG. 1) and/or mobile gaming devices 256 (shown in FIG. 2). The base game interface may include a plurality of reels, such as five reels, that are spun in response to the game instance and land in a position that displays a select number of symbols, such as four symbols. Accordingly, a slot game having five reels and four symbols displayed per reel has a game output of a matrix of twenty symbols. The base game may be evaluated to determine a player credit balance to be awarded based on the game output (e.g., the matrix of symbols) and a pay table. Certain symbols, referred to herein as "scatter symbols," may be displayed (or "fall") as an outcome of the base game, and have certain functions in triggering the free spin feature as described in further detail below. In some example embodiments, the base game may include collectible features as described below with respect to the free spin feature. These collectible features of the base game may be assessed separately from and/or otherwise differ from those described below with respect to the free spin feature.

In the example embodiment, process 400 may further include determining 404 that a number of scatter symbols that have fallen in response to the spin instance of the base game meets a threshold number of scatter symbols. For example, in some embodiments, up to five scatter symbols may be displayed in response to a base game spin instance, and the free game feature may be triggered in response to at least three scatter symbols appearing (e.g., three, four, or five scatter symbols appear).

In the example embodiment, process 400 may further include initiating 406 the free spin feature in response to the determination that the threshold number of scatter symbols have appeared. In the free spin feature, certain special symbols (referred to herein as "collectible symbols") may be displayed in response to a spin instance. Each reel may have an indicator that displays the total number of collectible symbols that have fallen for that reel (e.g., as a number and/or as a tally collection of symbols), which may be incremented in response to a collectible symbol falling in that reel. As described in further detail below, certain game features may occur in response to collecting a certain number of the collectible symbols for a given reel.

Initiating 406 the free spin feature may include resetting any features (e.g., collectibles and/or other persistent features) occurring in the base game. For example, if the base game includes collectibles, the number of collectibles displayed (e.g., for each reel) may be reset to zero. These collectibles may reappear upon completion of the free spin feature.

Initiating 406 the free spin feature may further include determining a number of free spins for the free spin feature. In some embodiments, a set number of free spins (e.g., twelve spins) may be awarded whenever the free spin feature is triggered. Alternatively, the number of free spins may depend on certain factors, such as the number of scatter symbols that fell during the base game (e.g., more scatter symbols may result in more free spins).

Initiating 406 the free spin feature may further include incrementing the number of collectibles for each reel based on a number of scatter symbols that is displayed in each reel in response to the base game spin. For example, if two scatter symbols appear in a given reel, the collectible indicator for that reel may be incremented to two in response to the initiation of the free spin feature. This gives users a "head start" in collecting these symbols.

In the example embodiment, process 400 further includes performing 408 a free spin. The free spin may be similar to a spin instance of the base game, but does not result in a reduction in the player credit balance. The free spin may be performed automatically upon initiation of the free spin feature, or may be performed in response to input from the user.

In the example embodiment, process 400 further includes determining 410 whether any collectible symbols have fallen in response to the free spin instance. In some embodiments, to determine determining whether a collectible symbol is displayed, a lookup may be performed in a lookup table based on an RNG outcome. The lookup table may provide a certain probability of displaying a collectable symbol. In some such embodiments, a separate, respective lookup table may be used for each reel, such that some reels may have a greater probability of displaying a collectible symbol than others. In some such embodiments, a lookup table for each reel is selected based on a current state of the game. For example, a lookup table providing a greater or lesser likelihood of displaying a collectible symbol may be selected based on how many collectible symbols have already been displayed and collected. For instance, a probability of displaying a collectible symbol in a particular reel may be greater if fewer collectible symbols have been displayed in the reel so far. Display of the scatter symbols, as described above, may similarly be determined using lookup tables separate for each reel and/or selected based on states of the game.

If a collectible symbol is displayed in a given reel, process 400 may further include incrementing 412 a number of collected symbols for each reel. This incrementation may be displayed through the indicator that displays the total number of collectible symbols (e.g., by incrementing a displayed number and/or by showing an additional symbol within the indicator). In some embodiments, certain symbols that may be displayed as a result of a free spin instance include multiple (e.g., two or three) collectible symbols, and when one of these symbols is displayed, the number of collected symbols is incremented accordingly (e.g., by two if the fallen symbol corresponds to two collectibles and by three if the fallen symbol corresponds to three collectibles).

In the example embodiment, process 400 further includes determining 414 that a threshold number of symbols collected symbols has been satisfied for a given reel. If the threshold number has been reached, process 400 may further include displaying a reel replacement feature in place of the reel, such as by converting 416 the reel to a "wild reel" (e.g., a reel that includes or represents all "wild" symbols). For example, in some embodiments, when the number of collectible symbols for a reel has reached three, the reel may be replaced with a reel replacement feature (e.g., converted to a wild reel). The reel replacement feature may remain for a set number of turns (e.g., three turns), and may provide the user an increased chance of obtaining reel outcomes that result in greater rewards. The reel replacement feature may include an indicator of how many remaining spins the reel replacement feature will be displayed, which may be decremented after each spin. In some embodiments, if a new reel is converted to a reel replacement feature while a previous reel replacement feature remains on the display, the number of spins for the previous reel replacement feature may be reset or incremented back to the initial number of spins (e.g., three spins).

In the example embodiment, process 400 further includes decrementing 418 the number of free spin credits after each free spin occurs. The number of spins left for each wild reel may also be decremented simultaneously. After the number of free spin credits is decremented 418, if it is determined 420 that free spin credits remain, another free spin may be performed (e.g., automatically or in response to user input). If no free spin credits remain, process 400 may further include resetting 422 to the base game, for example, by resetting the number of collectibles for each reel to zero and/or removing the collectible feature from the display. Credits awarded to the player credit balance during the free spin feature remain upon resumption of the base game. For embodiments in which the base game includes the collectible feature, collectibles that were cleared upon initiation of the free spin feature may be returned to the display when the free spin feature is complete.

Figure 5A:
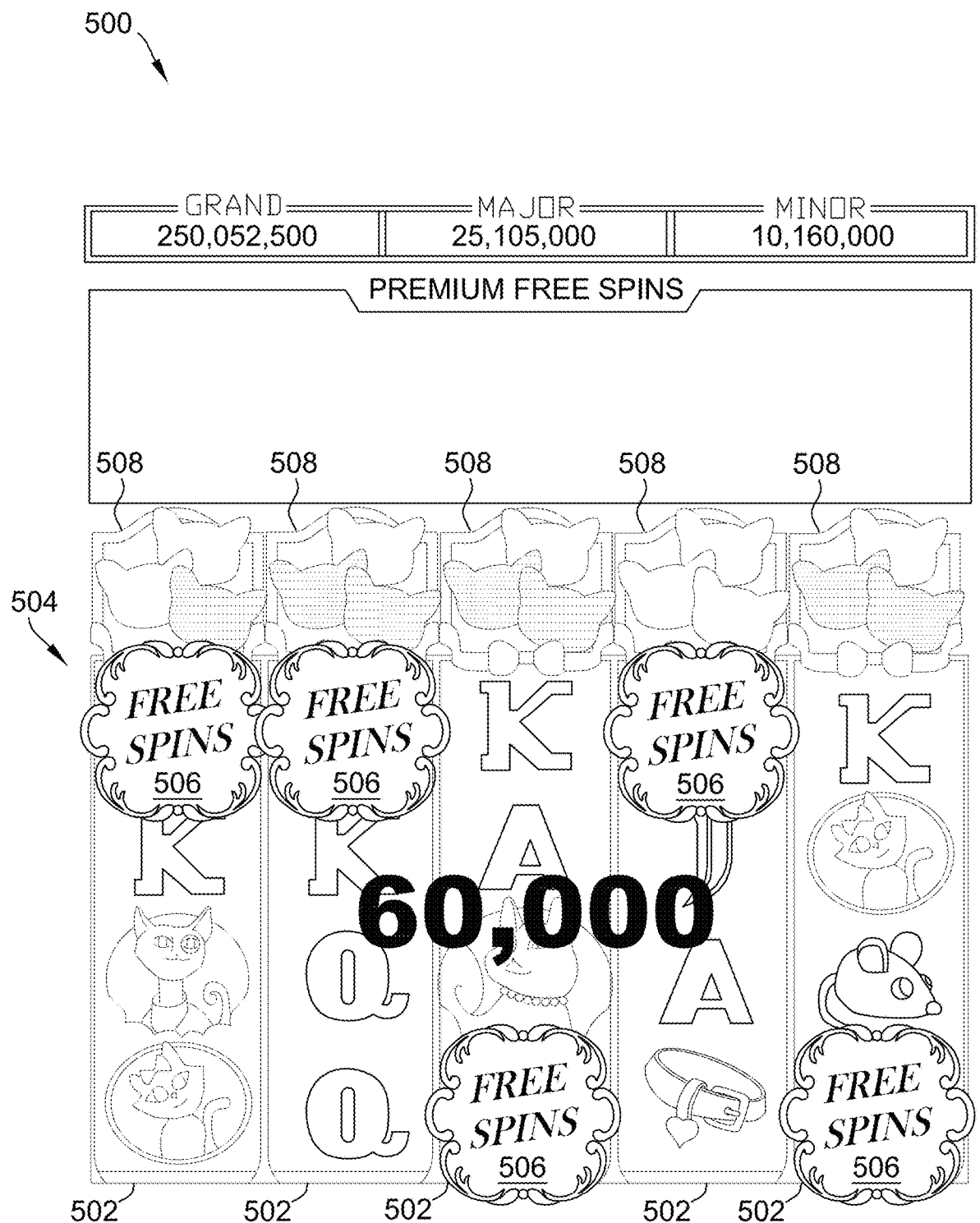
FIGS. 5A, 5B, 5C, 5D, 5E, 5F, 5G, and 5H are example screenshots of a sequence of an electronic game, as described herein.

FIG. 5A-5H are example screenshots 500, 510, 520, 530, 540, 550, 560, and 570 of an electronic game as described herein. Screenshots 500, 510, 520, 530, 540, 550, 560, and 570 may be displayed on, for example, a primary game display 240 of one of the EGMs 104 and/or mobile gaming devices 256. As shown in FIG. 5A, a game outcome of a base slot game includes a plurality of reels 502 each including a plurality of slot positions 504 that may include one or more scatter symbols 506 that, if a threshold number of which are present in the spin outcome, may result in an initiation of a free spin feature. The display may further include a collectible indicator 508, which may indicate a number of collectible symbols that have appeared for each reel. For example, screenshot 500 includes collectible indicators 508 that illustrate the number of collectibles (shown here as an outline of a kitten's head) out of a total of three needed to achieve a wild reel.

Figure 5B:

As shown in FIG. 5B, upon initiation of the free spin feature, a number of free spin credits may be determined and displayed. The number of free spin credits may be a fixed number, or may depend on other factors such as the number and/or position combination of scatter symbols. For example, if more scatter symbols are displayed, a greater number of free spin credits may be awarded.

Figure 5C:
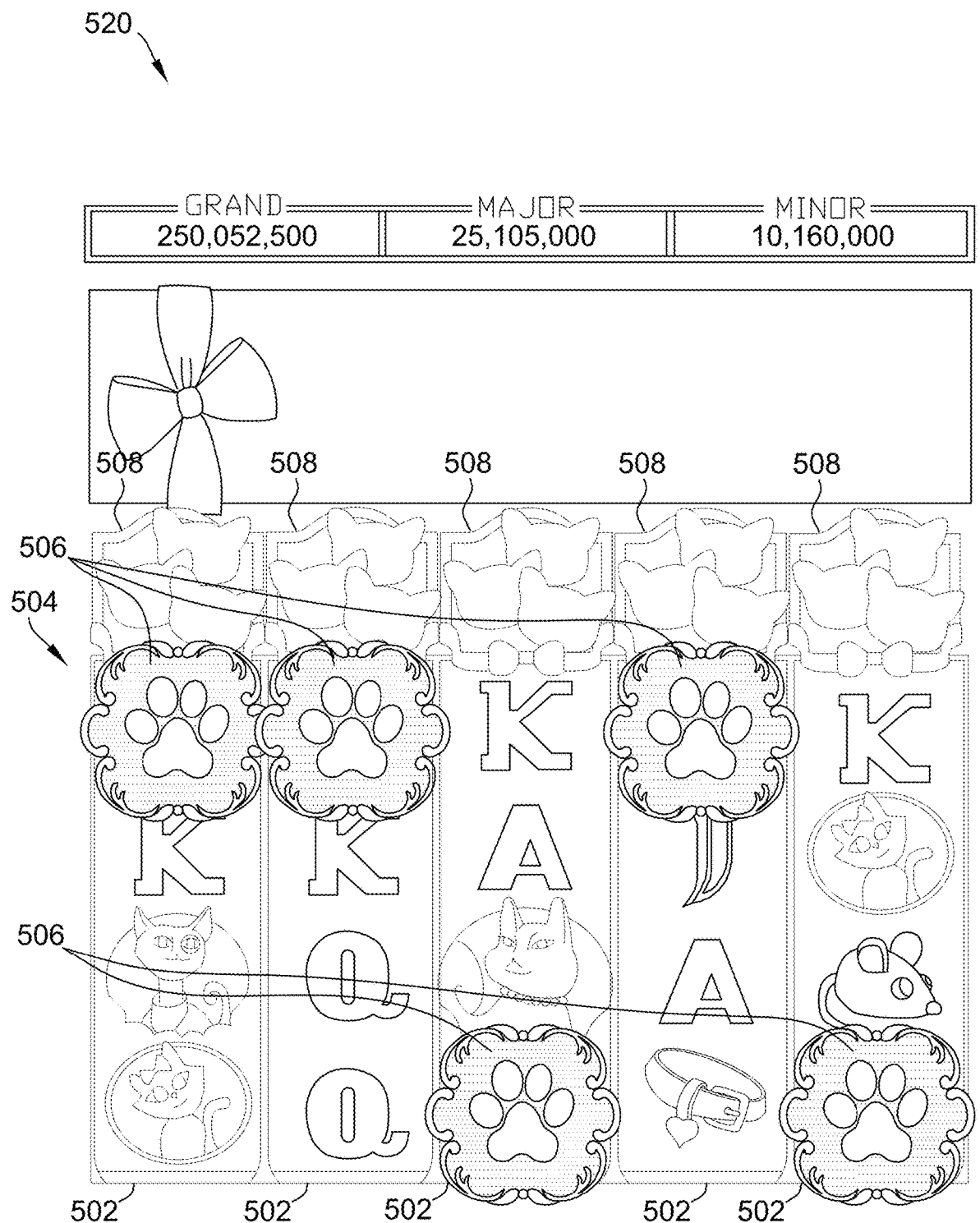
Figure 5D:
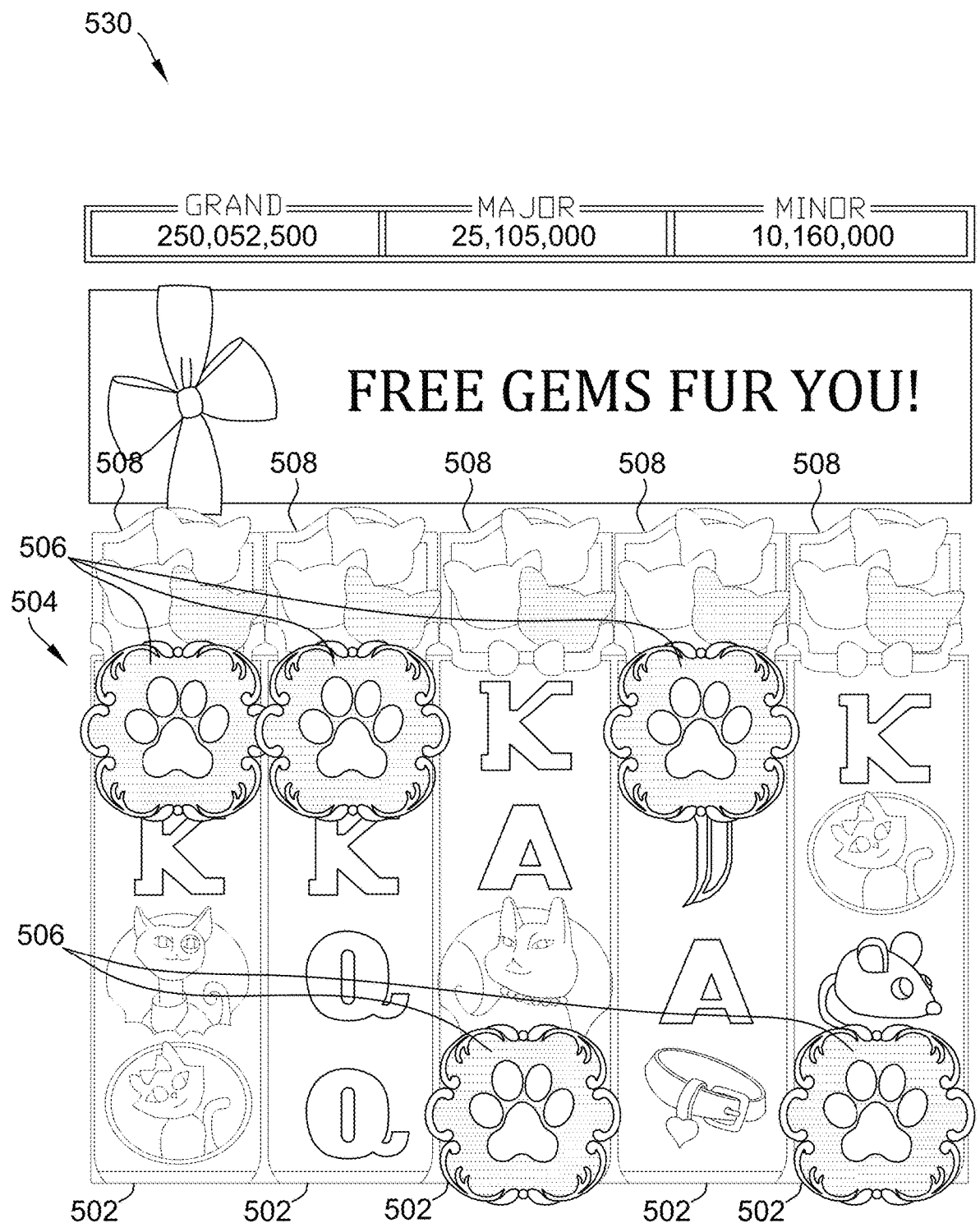

As shown in FIG. 5C, upon initiation of the free spin feature, the collectible indicators 508 may be reset (e.g., to zero out of three for each indicator). As shown in FIG. 5C, each scatter symbol 506 displayed as part of the base game outcome may be awarded as a collectible upon initiation of the free spin feature. In other words, for each scatter symbol in a given reel 502, the collectible indicator 508 is incremented. For example, as shown in FIG. 5D, screenshot 530, each reel 502 includes one scatter symbol 506 when the free spin feature is initiated, so each collectible indicator 508 is incremented by one.

Figure 5E:
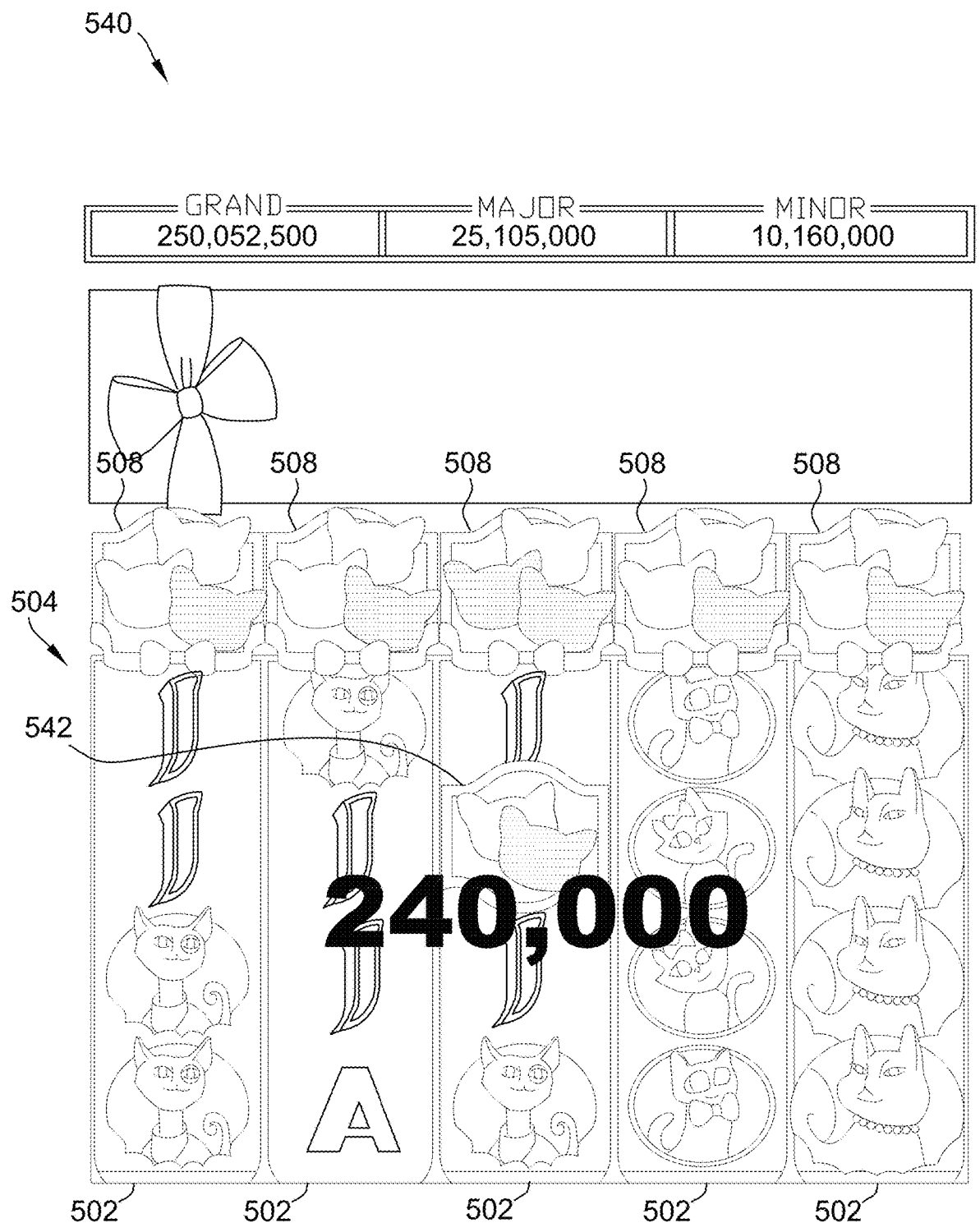
Figure 5F:
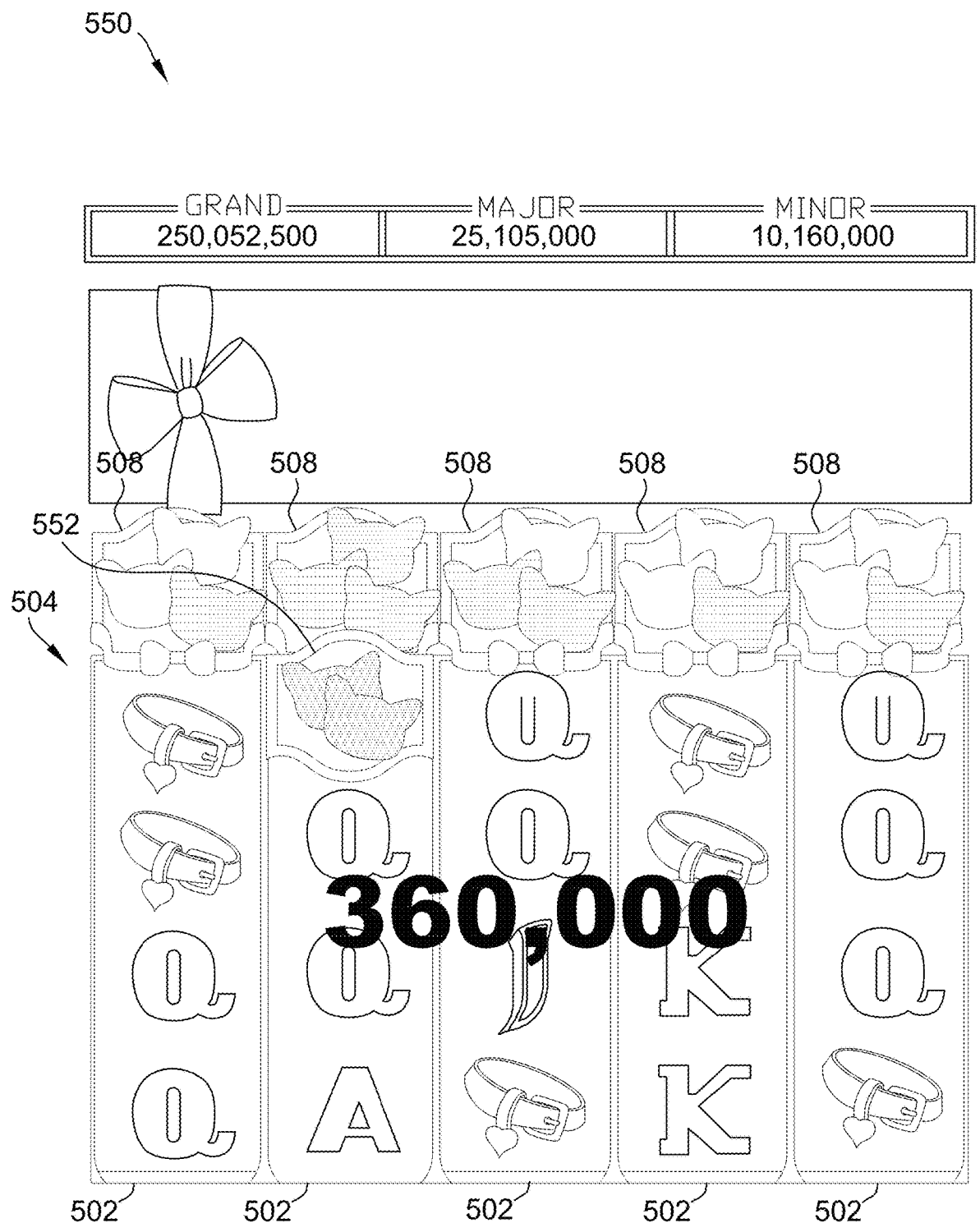

As shown in FIG. 5E, when the free spins are performed, a collectible symbol 542 (shown here is an outline of a kitten's head) may be displayed in one or more slot positions 504 as part of the spin outcome. For each collectible symbol that is displayed in a given reel 502, the collectible indicator 508 for that reel may be incremented. As shown in FIG. 5F, certain collectible symbol 552 (which may be referred to as "double" or "triple" collectible symbols) have a value corresponding to multiple (e.g., two or three) collectible items, which result in the corresponding collectible indicator 508 being incremented multiple (e.g., two or three) times. For example, double collectible symbol 552 shown in screenshot 550 has a value of two collectible items, indicated by double collectible symbol 552 including two kitten's heads, which results in the collectible indicator 508 of the reel 502 displaying double collectible symbol 552 being incremented by two.

Figure 5G:
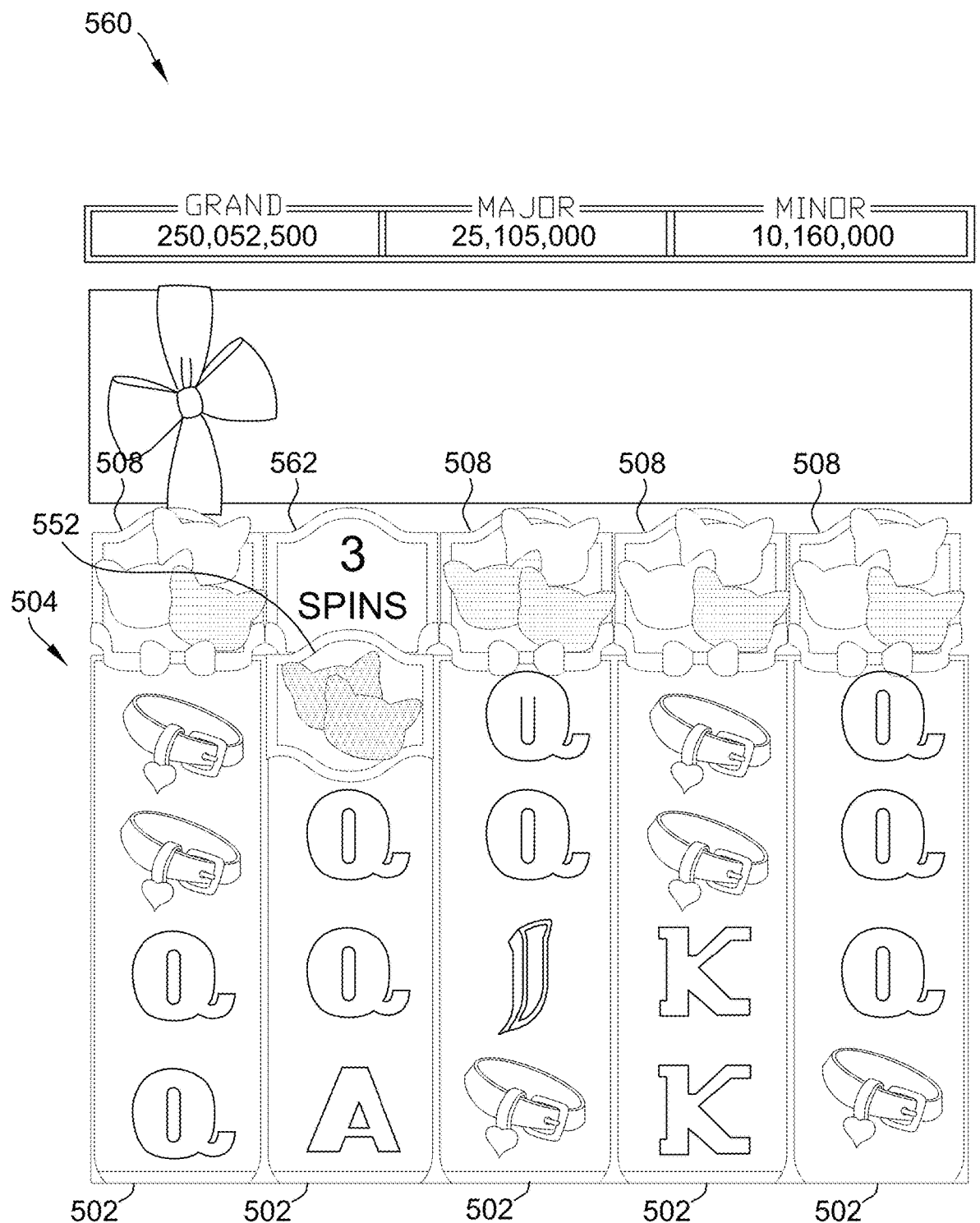
Figure 5H:
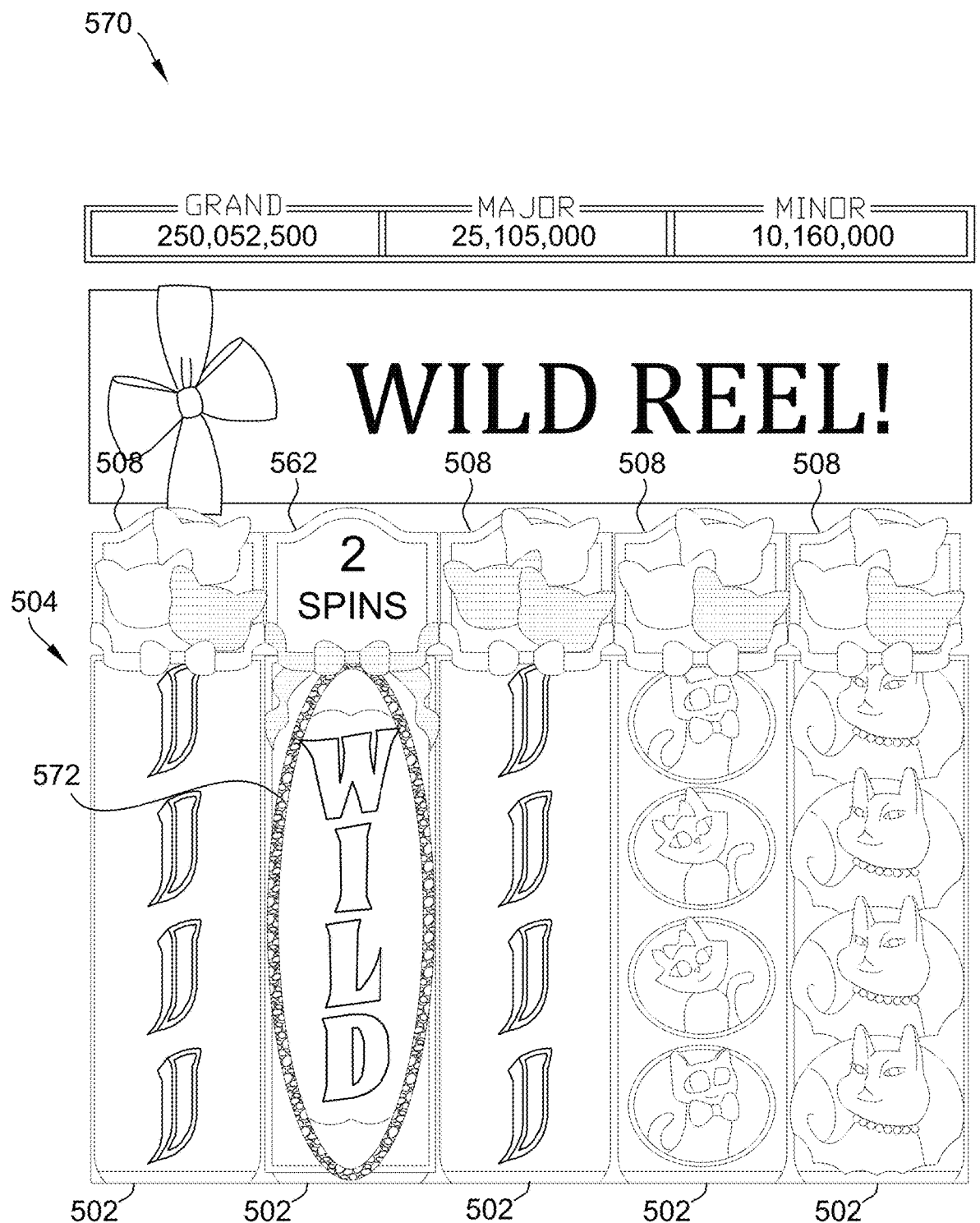

As shown in FIGS. 5G and 5H, when the number of collectibles for a certain reel 502 reaches a threshold (e.g., three collectibles), the collectible indicator 508 for the reel 502 is replaced with a wild spin indicator 562, which indicates the number of wild spins remaining for that reel and a wild reel symbol 572 is displayed in the reel itself. With respect to gameplay, the wild reel may function similarly to a reel filled with "wild" symbols, which may be used to complete certain credit-awarding combinations. The wild spin indicator 562 may be decremented after each spin, and the wild reel symbol 572 may be removed when no wild spins remain for the reel.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming device comprising a game display configured to display a game interface including a plurality of reel positions, a memory device, and a processor in communication with the game display and the memory device, the processor is configured to:
   display the game interface including a plurality of reels and a plurality of collection indicators, each of the plurality of collection indicators associated with one of the plurality of reels;
   in response to a game instance of a base game, determine that at least a threshold number of scatter symbols is displayed in respective reel positions of the plurality of reels;
   in response to the determination that at least the threshold number of scatter symbols is displayed, the threshold number of scatter symbols being greater than one, for each of the plurality of reels, cause the game display to increment a collection indicator of the plurality of collection indicators corresponding to each reel by a number of scatter symbols displayed in the corresponding reel;
   after incrementing the collection indicator for each reel based on the threshold number of scatter symbols being displayed, initiate a free spin feature and determine a number of free spin credits for the free spin feature while continuing to display the collection indicator;
   for each reel, select a respective lookup table from a plurality of lookup tables based on a current number of collectible symbols displayed in the collection indicator associated with the reel, wherein each of the plurality of lookup tables is associated with a corresponding probability of displaying a collectible symbol;
   for each reel, individually perform a lookup within the respective lookup table associated with the reel based on a random number generator (RNG) outcome;
   determine to cause at least one collectible symbol to be displayed in one of the reel positions of the plurality of reels based on the lookup performed for the reel corresponding to the one of the reel positions;
   in response to determining that one or more collectable symbols are displayed, cause the game display to increment the collection indicator for each of the plurality of reels in which the collection symbols are displayed;
   determine that one of the collection indicators is displaying a threshold number of collectible symbols; and
   in response to determining that one of the collection indicators has reached the threshold number of collectible symbols, cause the game display to display a reel replacement feature in place of the reel corresponding to the one of the collection indicators.

2. The gaming device of claim 1, wherein the reel replacement feature is a wild reel.

3. The gaming device of claim 1, wherein the processor is further configured to:
   in response to the free spin instance, decrement the number of free spin credits; and
   in response to a determination that the number of free spin credits is zero, cause the game display to reset the collection indicators to zero.

4. The gaming device of claim 1, wherein the threshold number of scatter symbols is three.

5. The gaming device of claim 1, wherein to determine the number of free spin credits, the processor is configured to determine the number of free spin credits based on the number of scatter symbols that is displayed.

6. The gaming device of claim 1, wherein the threshold number of collectible symbols is three.

7. The gaming device of claim 1, wherein the processor is further configured to, in response to causing the game display to display the reel replacement feature, determine a number of free spin instances during which to display the reel replacement feature.

8. The gaming device of claim 7, wherein the number of free spin instances during which to display the reel replacement feature is three.

9. The gaming device of claim 1, wherein the processor is further configured to, in response to a determination that the number of free spin credits is zero, cause the game display to cease displaying any reel replacement feature currently displayed.

10. The gaming device of claim 1, wherein the probability associated with each of the plurality of lookup tables corresponds to the number of symbols displayed in the corresponding collection indicator.

11. The gaming device of claim 1, wherein the processor is configured to determine at least one of the threshold number of scatter symbols or the threshold number of collectible symbols based on an RNG outcome.

12. A method performed by a gaming device including a game display configured to display a game interface including a plurality of reel positions, a memory device, and a processor in communication with the game display and the memory device, the method comprising:
  displaying, by the processor, the game interface including a plurality of reels and a plurality of collection indicators, each of the plurality of collection indicators associated with one of the plurality of reels;
  in response to a game instance of a base game, determining, by the processor, that at least a threshold number of scatter symbols is displayed in respective reel positions of the plurality of reels;
  in response to the determination that at least the threshold number of scatter symbols is displayed, the threshold number of scatter symbols being greater than one, for each of the plurality of reels, causing, by the processor, the game display to increment a collection indicator of the plurality of collection indicators corresponding to each reel by a number of scatter symbols displayed in the corresponding reel;
  after incrementing the collection indicator for each reel based on the threshold number of scatter symbols being displayed, initiating, by the processor, a free spin feature and determine a number of free spin credits for the free spin feature while continuing to display the collection indicator;
  for each reel, selecting, by the processor a respective lookup table from a plurality of lookup tables based on a current number of collectible symbols displayed in the collection indicator associated with the reel, wherein each of the plurality of lookup tables is associated with a corresponding probability of displaying a collectible symbol;
  for each reel, individually performing, by the processor a lookup within the respective lookup table associated with the reel based on a random number generator (RNG) outcome;
  determining to cause, by the processor, at least one collectible symbol to be displayed in one of the reel positions of the plurality of reels based on the lookup performed for the reel corresponding to the one of the reel positions;
  in response to determining that one or more collectable symbols are displayed, causing, by the processor, the game display to increment the collection indicator for each of the plurality of reels in which the collection symbols are displayed;
  determining, by the processor, that one of the collection indicators is displaying a threshold number of collectible symbols; and
  in response to determining that one of the collection indicators has reached the threshold number of collectible symbols, causing, by the processor, the game display to display a reel replacement feature in place of the reel corresponding to the one of the collection indicators.

13. The method of claim 12, wherein the reel replacement feature is a wild reel.

14. The method of claim 12, further comprising:
  in response to the free spin instance, decrementing, by the processor, the number of free spin credits; and
  in response to a determination that the number of free spin credits is zero, causing, by the processor, the game display to reset the collection indicators to zero.

15. The method of claim 12, wherein a probability associated with each of the plurality of lookup tables corresponds to the number of symbols displayed in the corresponding collection indicator.

16. At least one non-transitory computer-readable media having computer-executable instructions embodied thereon, wherein when executed by a gaming device including a game display configured to display a game interface including a plurality of reel positions, a memory device, and a processor in communication with the game display and the memory device, the computer-executable instructions cause the processor is to:
  display the game interface including a plurality of reels and a plurality of collection indicators, each of the plurality of collection indicators associated with one of the plurality of reels;
  in response to a game instance of a base game, determine that at least a threshold number of scatter symbols is displayed in respective reel positions of the plurality of reels;
  in response to the determination that at least the threshold number of scatter symbols is displayed, the threshold number of scatter symbols being greater than one, for each of the plurality of reels, cause the game display to increment a collection indicator of the plurality of collection indicators corresponding to each reel by a number of scatter symbols displayed in the corresponding reel;
  after incrementing the collection indicator for each reel based on the threshold number of scatter symbols being displayed, initiate a free spin feature and determine a number of free spin credits for the free spin feature while continuing to display the collection indicator;
  for each reel, select a respective lookup table from a plurality of lookup tables based on a current number of collectible symbols displayed in the collection indicator associated with the reel, wherein each of the plurality of lookup tables is associated with a corresponding probability of displaying a collectible symbol;
  for each reel, individually perform a lookup within the respective lookup table associated with the reel based on a random number generator (RNG) outcome;

determine to cause at least one collectible symbol to be displayed in one of the reel positions of the plurality of reels based on the lookup performed for the reel corresponding to the one of the reel positions;

in response to determining that one or more collectable symbols are displayed, cause the game display to increment the collection indicator for each of the plurality of reels in which the collection symbols are displayed;

determine that one of the collection indicators is displaying a threshold number of collectible symbols; and in response to determining that one of the collection indicators has reached the threshold number of collectible symbols, cause the game display to display a reel replacement feature in place of the reel corresponding to the one of the collection indicators.

\* \* \* \* \*